United States Patent
Osman et al.

(10) Patent No.: US 11,430,309 B1
(45) Date of Patent: Aug. 30, 2022

(54) DETACHABLE ACCESSORY FOR ENHANCED EFFECTS, ACCESSIBILITY, SPECTATING, AND PLAY-ALONG

(71) Applicant: Sony Interactive Entertainment Inc., Tokyo (JP)

(72) Inventors: Steven Osman, San Mateo, CA (US); Brielle Powell, San Diego, CA (US); Rizwana Rahman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 4 days.

(21) Appl. No.: 17/201,922

(22) Filed: Mar. 15, 2021

(51) Int. Cl.
    *G08B 6/00* (2006.01)
    *G08B 7/06* (2006.01)
    *G06F 3/01* (2006.01)

(52) U.S. Cl.
    CPC .............. *G08B 7/06* (2013.01); *G06F 3/016* (2013.01)

(58) Field of Classification Search
    CPC ... G08B 7/06; G06F 3/016; G06F 1/16; G06F 1/1632; G06F 1/1686; G06F 1/1688; H01R 33/90; G06G 3/016
    See application file for complete search history.

(56) References Cited

U.S. PATENT DOCUMENTS

| | | | |
|---|---|---|---|
| 8,267,786 B2 * | 9/2012 | Ikeda | A63F 13/2145 463/37 |
| 10,019,034 B2 * | 7/2018 | Barnett | G06F 3/0338 |
| 2018/0178118 A1 * | 6/2018 | Kyuma | A63F 13/235 |
| 2019/0155387 A1 * | 5/2019 | Saboune | G06F 3/016 |

OTHER PUBLICATIONS

"International Search Report and Written Opinion" dated Apr. 28, 2022, from the counterpart PCT application PCT/US22/020094.

\* cited by examiner

*Primary Examiner* — Toan N Pham
(74) *Attorney, Agent, or Firm* — John L. Rogitz (57) ABSTRACT

A detachable for a computer game controller or a mobile device includes LEDs, speakers, haptic actuators, an accessory port, and other features. When attached to the phone or controller, the device can enhance the experience by adding extra sound, light, and haptics, or it can replace the game's sound with lights or haptics, replace game visuals with sounds, and replace game haptics by lights. When detached, the device can be handed to a second person to enhance the spectating experience by additional visuals, haptics and sounds and for using light or sound to indicate what actions the player is taking (to help learn the game) and allow play-along through an accessory port that supports controls. Light, sound or haptics can be used to indicate what actions the player is taking.

17 Claims, 8 Drawing Sheets

| GAME SIGNAL | ACCESSORY ACTION(S) |
|---|---|
| FLYOVER | ACTUATE HAPTICS; PLAY JET SOUND |
| GUNSHOT | BLINK LED; HAPTICS; PLAY POP |
| ⋮ | ⋮ |

| SOUND TO BE REPLACED | ACCESSORY ACTION(S) |
|---|---|
| CAR ENGINE | BUZZING HAPTICS; ROLLING LIGHTS |
| GUNSHOT | SINGLE POP HAPTICS; FLASH LED ONCE |
| ⋮ | ⋮ |

| VISUAL TO BE REPLACED | ACCESSORY ACTION |
|---|---|
| PLANE | PLAY JET SOUND |
| BIRD | PLAY CHIRP; SMALL SHORT BUZZ |
| ⋮ | ⋮ |

| HAPTIC TO BE REPLACED | ACCESSORY ACTION |
|---|---|
| LONG BUZZ | - STEADY LED ILLUMINATION<br>- STEADY BUZZ SOUND |
| POP | - QUICK ON-OFF LED |
| ⋮ | ⋮ |

DETACHABLE ACCESSORY FOR ENHANCED EFFECTS, ACCESSIBILITY, SPECTATING, AND PLAY-ALONG

FIELD

The present application relates to technically inventive, non-routine solutions that are necessarily rooted in computer technology and that produce concrete technical improvements.

BACKGROUND

As understood herein, the growing variety and richness of computer games opens a window to further sensory output for multiple purposes.

SUMMARY

Accordingly, present principles are directed to a detachable accessory for enhanced effects, accessibility, spectating, and play-along that is used with either a handheld controller (for example, DualShock® or DualSense® made by Sony), or mobile device (e.g., a cell phone). The accessory can have LEDs, speakers, haptic actuators, an accessory port, and other features. When attached to the phone or controller, the accessory enhances the experience by adding extra sound, light, and haptics, such as for indicating the direction of an enemy.

The accessory also can enhance accessibility by, e.g., replacing the game's sound with lights or haptics, replacing the game's visuals with sounds, replacing the game's haptics by lights instead.

When detached, the accessory can be handed to a spectator or a second user. In this mode it can enhance the spectating experience by additional visuals, haptics and sounds as well as use light or sound to indicate what actions the player is taking (to help learn the game), e.g., what button they are pressing, what game they are launching, etc. The light sources can indicate the player's actions which may be otherwise hard to see.

Play-along through an accessory port is facilitated. This port can support buttons, joysticks, switches, etc., which can simulate button presses by the player, allowing the spectator to play along. These can be special accessibility buttons.

Accordingly, an assembly includes at least one computer control device such as a computer simulation controller, a mobile telephone, etc. The assembly includes at least one accessory detachably engageable with the computer control device. The accessory includes at least one haptic generator, and/or at least one light source, and/or at least one speaker, and at least one processor programmed with instructions to actuate the generator, or the light source, or the speaker, or any combination thereof in response to signals from a simulation being controlled by the computer control device.

In some embodiments, the instructions can be executable by the processor to actuate the generator or the speaker or both the generator and the speaker responsive to a demanded image indicated by the signals from the simulation. These embodiments may include at least one display device presenting the simulation, and the demanded image may not be presented by the display device such that the haptics or sound produced by the accessory replaces, as sensory input to the user, the demanded image that otherwise would be presented on the display device.

In some embodiments, the instructions can be executable by the processor to actuate the generator or the light source or both the generator and the light source responsive to a demanded audio indicated by the signals from the simulation. These embodiments may include at least one display device presenting the simulation, and the demanded audio may not be presented by the display device such that the light or haptics produced by the accessory replaces, as sensory input to the user, the demanded sound that otherwise would be presented on the display device.

In some embodiments, the instructions can be executable by the processor to actuate the speaker or the light source or both the speaker and the light source responsive to a demanded haptic indicated by the signals from the simulation. These embodiments may include at least one display device presenting the simulation, and the demanded haptic may not be presented by the display device such that the light or sound produced by the accessory replaces, as sensory input to the user, the demanded haptic that otherwise would be presented on the display device.

In some embodiments, the instructions can be executable by the processor to, responsive to the accessory being disengaged from the control device, actuate at least one of the light sources(s), speaker, or generator or any combination thereof to indicate quality of simulation control command input. The accessory may include at least one element manipulable to generate the simulation control command input.

The assembly may include at least one display device presenting the simulation and separate from the accessory and the control device, and the instructions can be executable by the processor to activate the generator, or the light source, or the speaker, or any combination thereof in response to signals from the simulation. The signals from the simulation include demanded audio and/or demanded images presented on the display device such that activation of the generator, or the light source, or the speaker, or any combination thereof augments the simulation displayed on the display device.

In another aspect, a device includes at least one computer storage that is not a transitory signal and that in turn includes instructions executable by at least one processor to execute any one or more of the below:

activate, on an accessory detachably engaged with a control device for a computer simulation, at least one haptics generator, or at least one light source, or at least one speaker, or any combination thereof in response to signals from the simulation. The signals from the simulation include demanded audio and/or demanded images presented on a display device such that activation of the generator, or the light source, or the speaker, or any combination thereof augments the simulation displayed on the display device;

actuate the generator or the speaker or both the generator and the speaker responsive to a demanded image indicated by the signals from the simulation;

actuate the generator or the light source or both the generator and the light source responsive to a demanded audio indicated by the signals from the simulation;

actuate the speaker or the light source or both the speaker and the light source responsive to a demanded haptic indicated by the signals from the simulation;

responsive to the accessory being disengaged from the control device, actuate at least one of the light sources(s), speaker, or generator or any combination thereof to indicate quality of simulation control command input.

In another aspect, a method includes detachably engaging, without fasteners, an accessory with a computer simulation controller, and using the computer simulation controller to control a computer simulation presented on a display. The method also includes using the accessory to produce haptics and/or light source activation and/or sound responsive to signals from the computer simulation. If desired, the method may include detaching the accessory from the computer simulation controller and using the accessory to input signals to the simulation.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks including drones used for gaming or non-gaming purposes. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
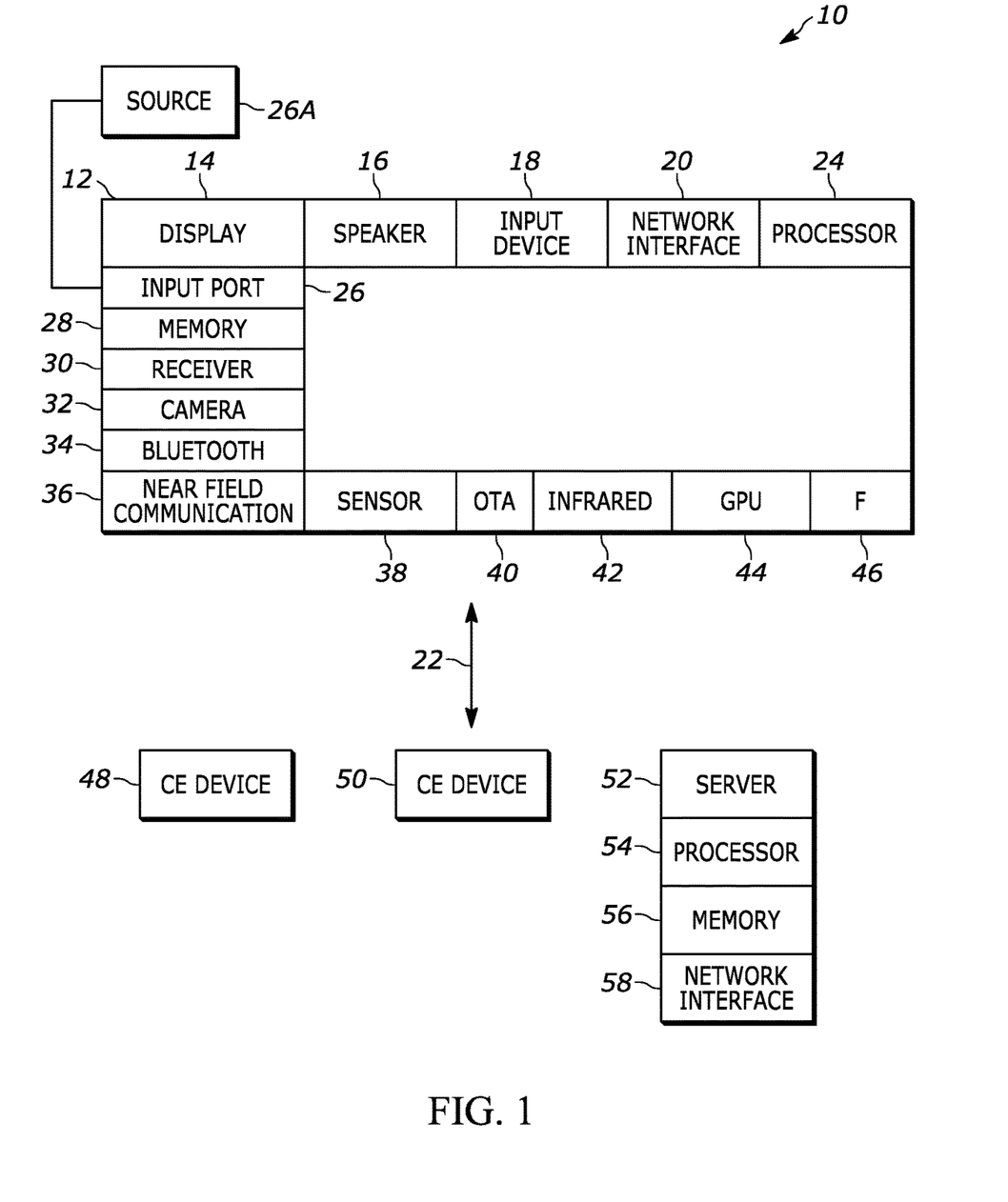
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. For example, the below-described accessory may include appropriate components in FIG. 2. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

Figure 2:
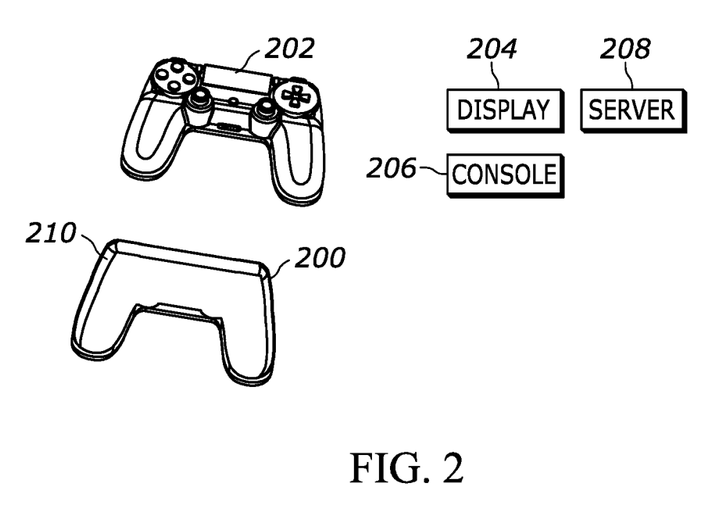
FIG. 2 illustrates a first example embodiment of the accessory.
Figure 3:
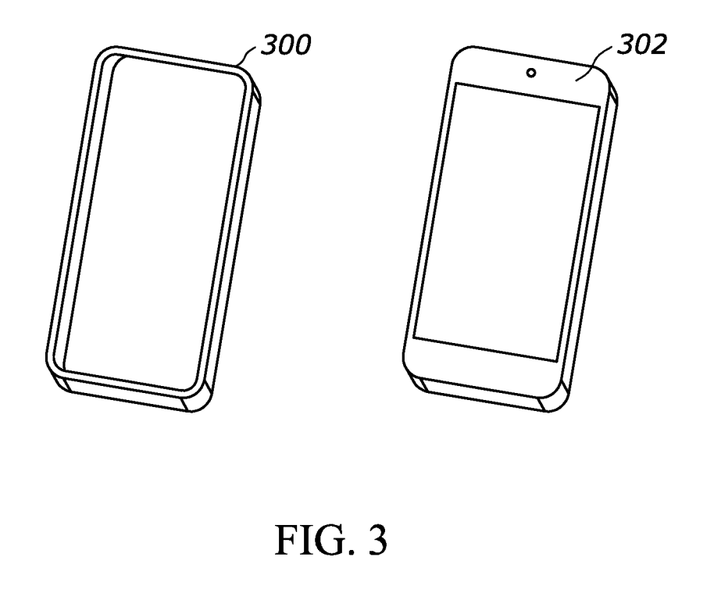
FIG. 3 illustrates a second example embodiment of the accessory.
Figure 4:
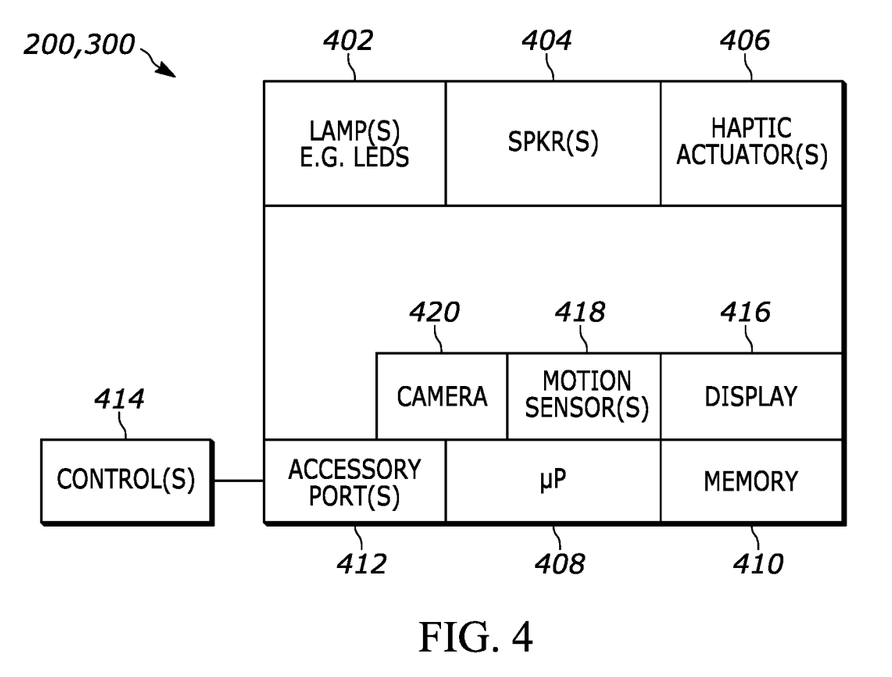
FIG. 4 is a block diagram of example components of the accessory.

The components shown in FIGS. 2-4 may include some or all components shown in FIG. 1.

FIG. 2 illustrates an accessory 200 that may be detachably engaged with a computer simulation controller 202 such as but not limited to a PlayStation® controller or Xbox® controller. The controller 202 controls presentation of a computer simulation such as a computer game on one or more display devices 204, which may receive game signals from one or more simulation consoles 206 and/or one or more streamlining servers 208. It is to be understood that the accessory 200 may communicate via wired or wireless paths with any one or more of the components shown in FIG. 2.

In the example shown, the contour of the accessory 200 substantially matches that of the controller 202, and the accessory 200 may include raised walls 210 forming a partially open enclosure into which the controller 202 may be detachably received as in, for example, an interference fit or snapping engagement.

Alternatively, as shown in FIG. 3 an accessory 300 may include a contour that may generally match the contour of a mobile communication device 302 such as, for example, a cell phone. The accessory contemplated herein may have other shapes than those illustrated.

FIG. 4 shows that the accessory 200 or 300 may include relevant components from FIG. 1 and as potentially introduced in FIG. 4, including one or more light sources 402 which may be implemented by light emitting diodes (LED). The accessory may further include one or more audio speakers 404 and one or more haptics generators 406. These sensor output devices may be controlled by one or more processor 408 accessing one or more computer storages or memories 410 to execute logic herein.

The accessory may also include one or more accessory ports 412 which can be electrically engaged with one or more controls 414 such as buttons, joysticks, etc. The controls 414 may include any or all of the controls on a Play Station game controller, for instance. In some embodiments the accessory may include one or more video displays 416, one or more motion sensors 418, and one or more cameras 420 for purposes to be shortly disclosed. As mentioned elsewhere herein, the accessory may include a processor, a wireless transceiver, and a power source such as a battery.

Figure 5:
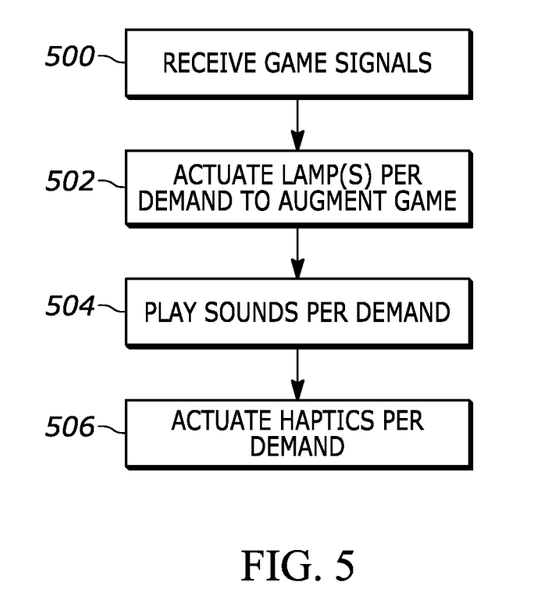
FIG. 5 illustrates example logic in example flow chart format for augmenting computer simulation (e.g., computer game) output signals.
Figure 6:
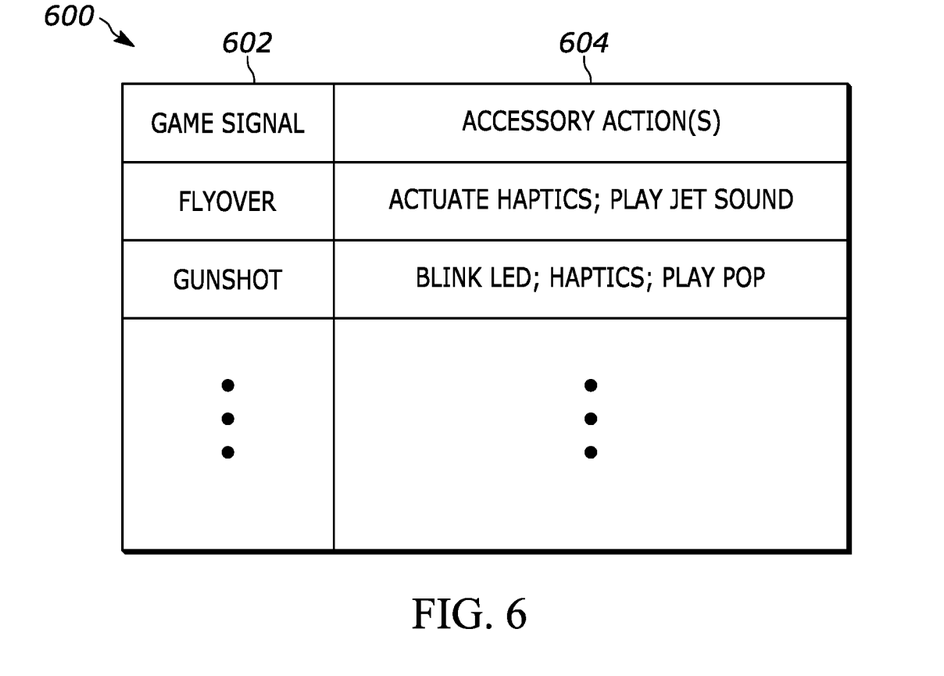
FIG. 6 illustrates an example data structure in example table format consistent with FIG. 5.

FIGS. 5 and 6 illustrate that in one use case the accessory contemplated herein may be used to augment sensory input to the player of a computer game. Game signals may be received at block 500, and the light source(s) 402 activated at block 502 responsive to the game signals to augment presentation of the game as sensed by the player. Similarly, the speaker(s) 404 may be activated at block 504 responsive to the game signals to augment presentation of the game as sensed by the player. Likewise, the haptics generator(s) 406 may be activated at block 506 responsive to the game signals to augment presentation of the game as sensed by the player.

In some embodiments the signals to activate the light sources/speakers/haptics on the accessory may come directly from the game, i.e., the game developer may program the activation signals into the metadata of the game with the accessory in mind. Thus, the game metadata may contain explicit signals such as "blink LEDs on accessory at time t" or "play beep on accessory speaker at time t" or "activate haptics generator on accessory at time t".

In other embodiments a data structure 600 may be accessed by the accessory processor 408 shown in FIG. 4 to correlate various in-game signals, shown in column 602, to accessory actions, shown in column 604. Thus, for instance, if the game metadata indicates an airplane flyover, the accessory can correlate that to actuating the haptics generator(s) 406 shown in FIG. 4, e.g., to buzz for a short period, and to play a jet sound effect on the speaker(s) 404 shown in FIG. 4. On the other hand, if the game signal indicates a gunshot, this may be correlated to a single blink of the light source 402 shown in FIG. 4, playing of a popping sound effect on the speakers 404, and a single jolt from the haptics generator 406. Other correlations may be developed as desired.

In other embodiments the correlation may be executed by any of the devices herein and sent to the accessory.

In other embodiments, in lieu of game metadata indicating the game signal in column 602, image recognition may be performed on images from the accessory camera 420 shown in FIG. 4 or other camera discussed herein to indicate the game signal in column 602. Audio recognition may also be performed on sounds played by the display device 204 for the same purpose.

Figure 7:
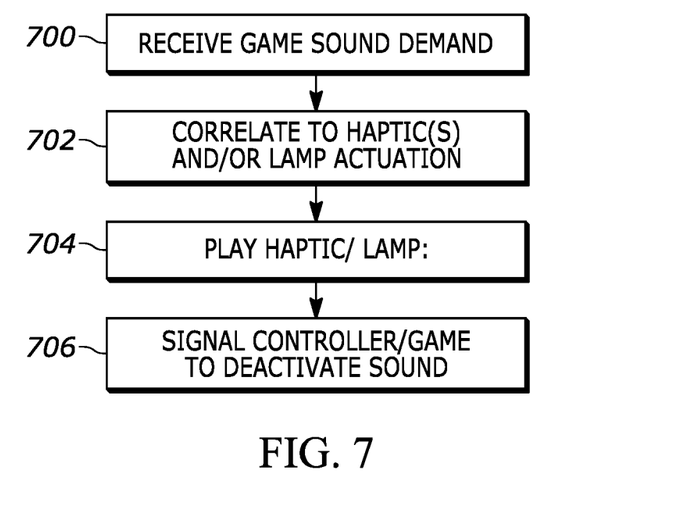
FIG. 7 illustrates example logic in example flow chart format for replacing game sound with light source and/or haptics using the accessory.
Figure 8:
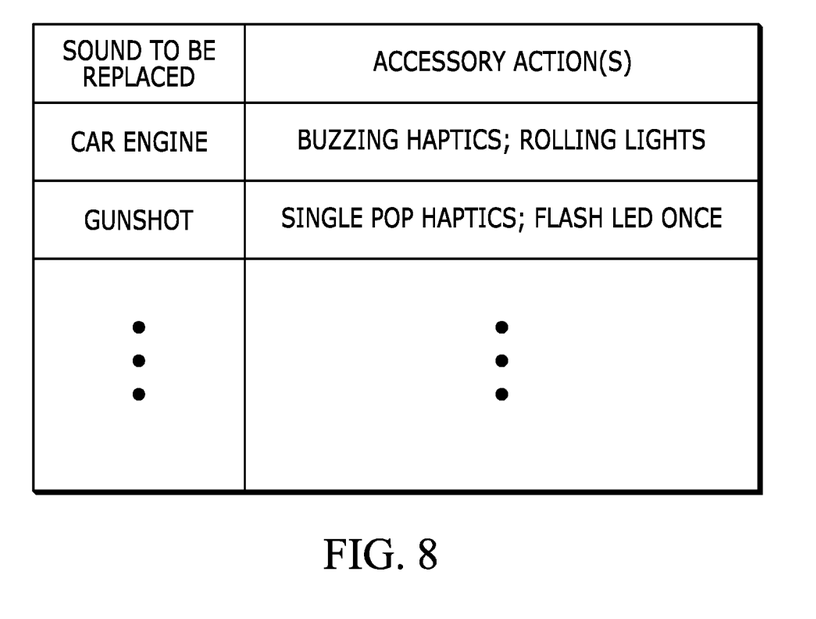
FIG. 8 illustrates an example data structure in example table format consistent with FIG. 7.
Figure 9:
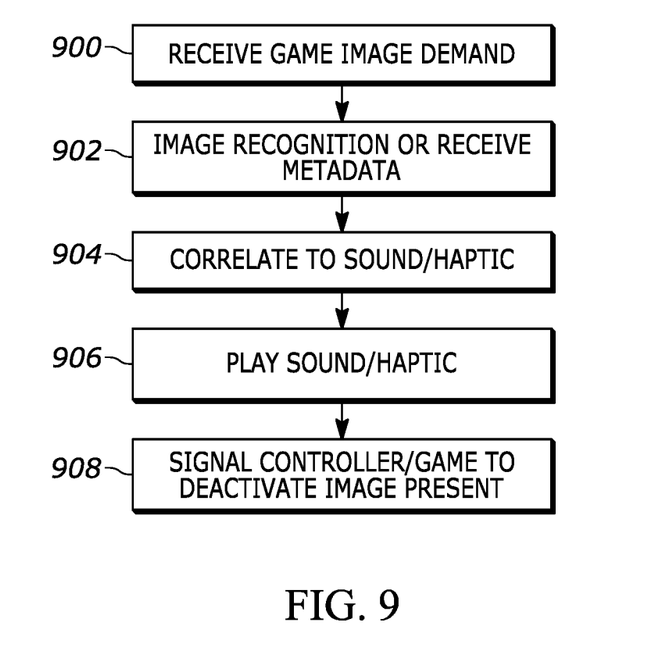
FIG. 9 illustrates example logic in example flow chart format for replacing game images with sound and/or haptics using the accessory.
Figure 10:
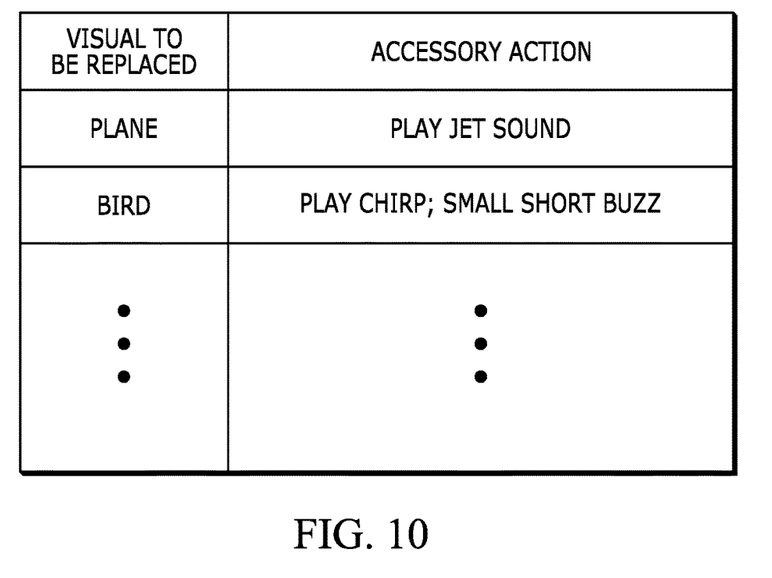
FIG. 10 illustrates an example data structure in example table format consistent with FIG. 9.
Figure 11:
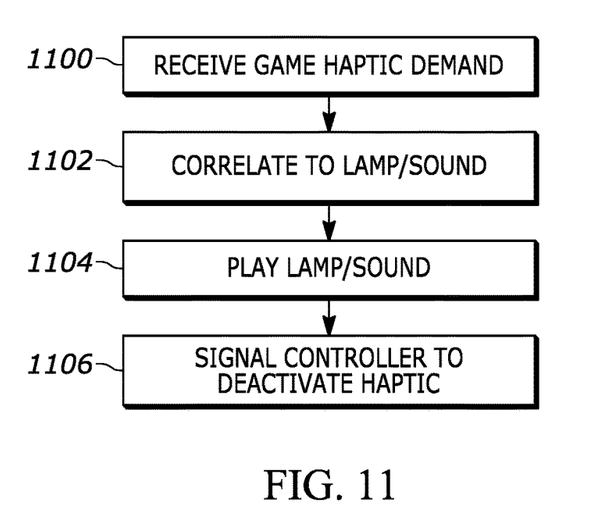
FIG. 11 illustrates example logic in example flow chart format for replacing game haptics with light source and/or sound using the accessory.
Figure 12:
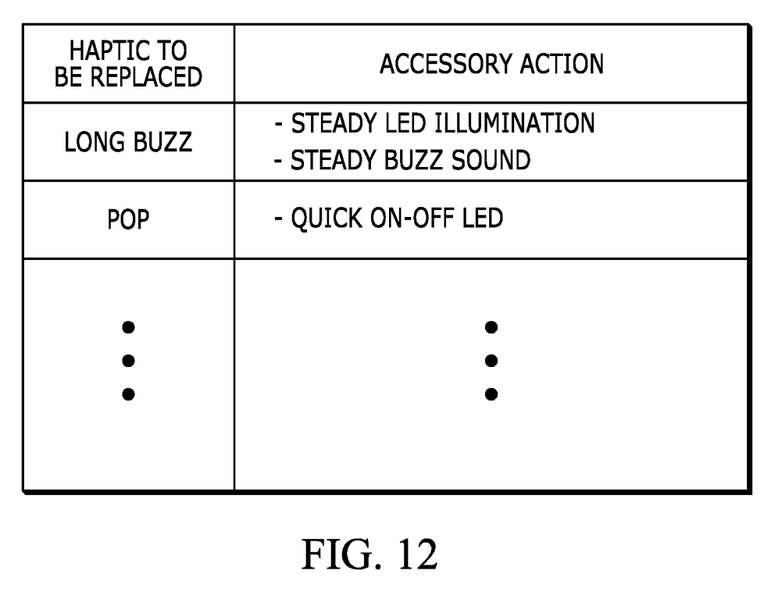
FIG. 12 illustrates an example data structure in example table format consistent with FIG. 11.

FIGS. 7 and 8 illustrate replacing game audio with visual sensory input from the accessory and/or haptics input from the accessory, FIGS. 9 and 10 illustrate replacing game images presentation with sound input from the accessory and/or haptics input from the accessory, while FIGS. 11 and 12 illustrate replacing game haptics with visual sensory input from the accessory and/or audio from the accessory. It should be noted that while these figures assume correlating game signals to replacement sensory input from the accessory, as is the case above direct commands to the accessory to activate its various output devices may be directly embedded in the game metadata, in which case the correlations discussed are done a priori.

Considering FIGS. 7 and 8, at block 700 in FIG. 7 a signal representing a demanded sound from the simulation (e.g., computer game) being executed is received. The signal is correlated at block 702 to a haptic and/or light source actuation, which is presented at block 704 by the accessory in a human-sensible way. If desired, in one option at block 706 a signal may be sent, e.g., from the accessory to the simulation to not play or otherwise deactivate the demanded sound, which in effect is replaced by the visible or tactile output of the accessory.

FIG. 8 presents example correlations of sound to light source activation/haptic generation. A demanded simulation sound for a car engine may be correlated to a buzzing signal generated by the haptic generator 406 of the accessory and/or a rolling sequence of light source activation using the light sources 402 of the accessory such that a sequence of light sources is activated one after another to present a sequence of illuminations. A demanded gunshot signal from the simulation may be correlated to a single pop generated by the haptic generator 406 and/or a single bright flash from a light source 402 of the accessory.

Turning now to FIGS. 9 and 10, at block 900 in FIG. 9 a signal representing a demanded image from the simulation (e.g., computer game) being executed is received. At block 902 the image may be identified by metadata or image recognition performed on, e.g., images of the display device 204 from the camera 420 shown in FIG. 4, in the event that the simulation does not include a direct call for an output device on the accessory. The demanded image is correlated at block 904 to a haptic and/or speaker actuation, which is presented at block 906 by the accessory in a human-sensible way. If desired, in one option at block 908 a signal may be sent, e.g., from the accessory to the simulation to not play or otherwise deactivate the demanded image, which in effect is replaced by the acoustic or tactile output of the accessory.

FIG. 10 presents example correlations of image to speaker activation/haptic generation. An image of a plane, although demanded by the simulation, may not be presented on the display device 204 and instead a replacement jet sound may be played on the speakers 404 of the accessory. An image of a bird, although demanded by the game, may not be presented on the display and instead a chirp sound effect may be played on the speaker 404 of the accessory and/or a short mild buzz output by the haptic generator 406.

Considering FIGS. 11 and 12, at block 1100 in FIG. 11 a signal representing a demanded haptic from the simulation (e.g., computer game) being executed is received. The signal is correlated at block 1102 to a speaker and/or light source actuation, which is presented at block 1104 by the accessory in a human-sensible way. If desired, in one option at block 1106 a signal may be sent, e.g., from the accessory to the simulation to not play or otherwise deactivate the demanded haptic, which in effect is replaced by the visible or acoustic output of the accessory.

FIG. 12 presents example correlations of haptic to light source activation/sound generation. A demanded long buzz from, e.g., the game controller during game play may be replaced by a steady illumination of a light source 402 on the accessory and/or by a steady buzzing sound effect played on the speaker 404 of the accessory. A demanded pop from the game controller may be replaced by a quick on-off illumination of the light source 402 of the accessory.

Figure 13:
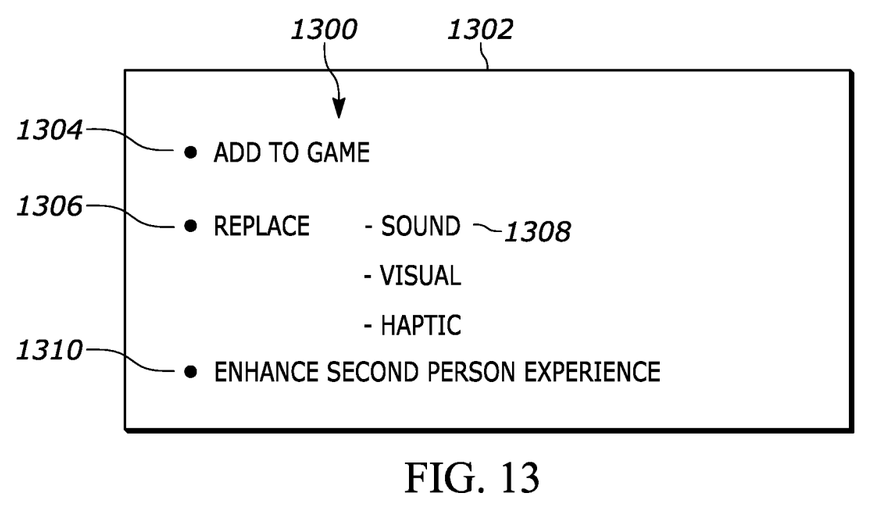
FIG. 13 illustrates an example user interface consistent with present principles.

FIG. 13 illustrates an example user interface (UI) 1300 that may be presented on a display 1302 such as any of the displays herein to enable selection of present features. A selector 1304 may be selectable to enable the logic of FIG. 5 to augment game presentation with signals from the accessory. A replace selector 1306 may be selectable to select from a menu 1308 to replace demanded sound, or images, or haptics from the display device 204/game controller with sensory output from the accessory consistent with FIGS. 7-12. A selector 1310 may be selected to enable the logic of FIG. 14 to enhance the experience of a second person such as a spectator of a computer game or second player of the computer game.

Figure 14:
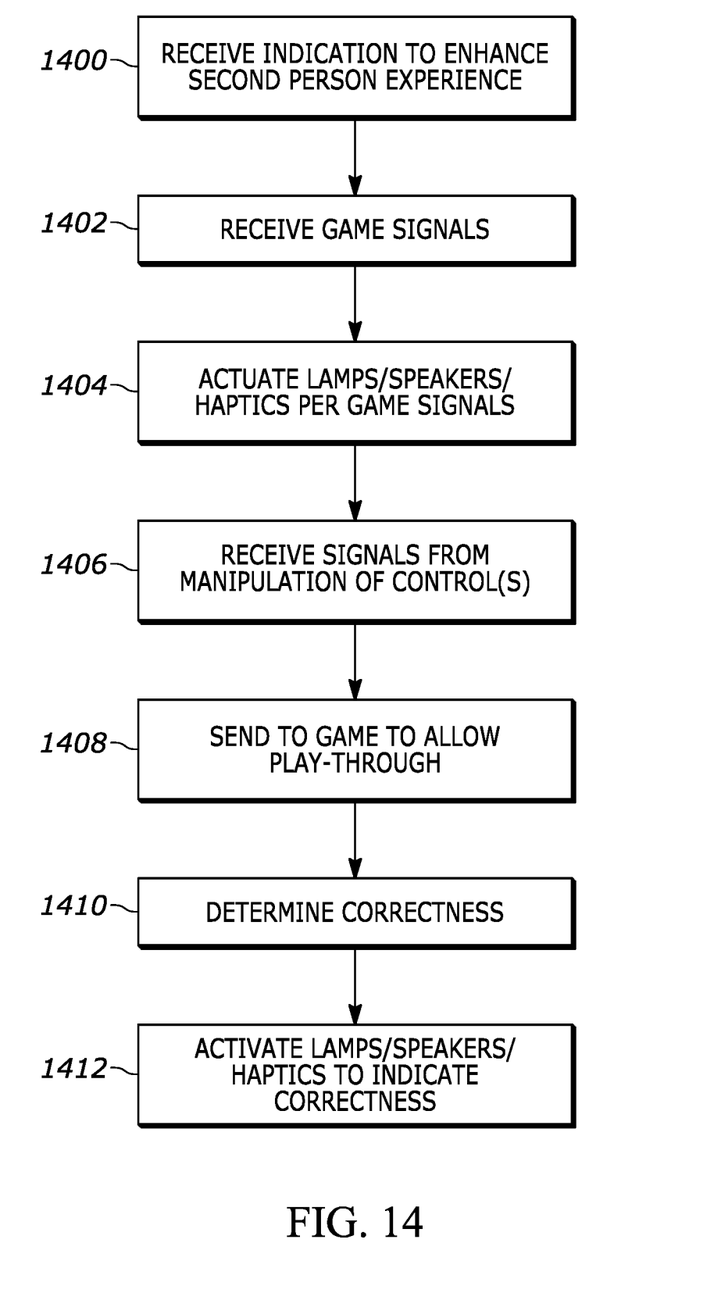
FIG. 14 illustrates example logic in example flow chart format for second person use of the accessory.

Accordingly, referring now to FIG. 14, at block 1400 an indication is received to use the accessory to enhance the gaming experience of a second person such as a second gamer or spectator of a game being played by a first player. This indication may be detachment of the accessory 200/300 from a control device or the attachment of the accessory 200/300 with a control device as indicated by, e.g., images from the camera 420 on the accessory or signals from the motion sensor 418, or as indicated by selection of the selector 1310 in FIG. 13.

Proceeding to block 1402, the accessory receives game signals from the computer simulation (e.g., game) being executed and controlled using the controller 202 shown in FIG. 2. Moving to block 1404, the light source(s) 402/speaker(s) 404/haptic generator(s) 406 of the accessory are activated according to the control signals from the game. In this way, when, for example, a shot is fired in the game, a spectator holding the accessory may experience a pop sound from the accessory speaker 404 and/or a flash of the light source 402 and/or a jolt from the haptics generator 406, indicating the event occurring in the game.

In spectator mode, some of the visuals, sounds, and/or haptics presented by the accessory can be tied directly to the player's button presses. That way the spectator holding the accessory can feel/see button presses that are otherwise occluded by the player's fingers and hands. This could help, for instance, to learn the rhythm of the button presses.

Note also that it may make sense to replace haptics with haptics. For example, some people may feel that high frequency haptics in a controller are uncomfortable. In that case, the controller haptics may be disabled and replaced with a different type of more palatable haptic presented on the accessory.

Block 1406 indicates that in addition to enhancing second person experiences, one or more of the controls 414 shown in FIG. 4 may be connected to the accessory port 412 and manipulated by the second person to input to the accessory processor 408 game control signals. These signals may be sent from the accessory to the device executing the game at block 1408 to allow play-through of the game in accordance with the signals received at block 1406, i.e., to enable the second person holding the accessory to input game commands to control the game.

If desired, correctness of the input received at block 1408 may be determined at block 1410. For example, metadata from the game or other source may indicate which game commands are better than others, e.g., based on a history of game play by experts, and from this data the correctness of the second person's input may be determined by determining how much the input diverged from the "best" expert input to indicate quality of simulation control command input.

Block 1412 indicates that the light source(s) 402/speaker(s) 404/haptics generator(s) 406 of the accessory may be activated consistent with the determination at block 1410 to provide sensory information as to the correctness of the second person's play, to train the second person, for instance. For example, a green light source 402 may be illuminated and a gentle chime played on the speaker 404 for a good input, while for a less good input a red-light source 402 may be illuminated, an unpleasant buzz played on the speaker 404, and a jolt emitted by the haptic generator 406.

Note that two people might "own" a single accessory described herein, or at least the cradle to which the accessory attaches. The first person can detach the accessory from his controller and the second person attach it to her controller. The second person can then use her controller as input and output rather than just limited to the output devices connected to the accessory and input devices connected to the accessory's accessory port. Uses of the accessory can be mixed and matched, e.g., disengage the device from the first person's controller and engage with the second person's phone, or disengage it from the first person's phone and engage the accessory with the second person's controller. The accessory can also be used for a physical transfer/transmission of a gameplay session.

It will be appreciated that whilst present principals have been described with reference to some example embodiments, these are not intended to be limiting, and that various alternative arrangements may be used to implement the subject matter claimed herein.

What is claimed is:

1. An assembly, comprising:

at least one computer control device;

at least one accessory detachably engageable with the computer control device and comprising:

at least one haptic generator;

at least one light source;

at least one speaker; and at least one processor programmed with instructions to:

activate the generator, or the light source, or the speaker, or any combination thereof in response to signals from a computer simulation, the signals from the simulation comprising demanded audio and/or demanded images presented on at least one display device configured for presenting the simulation and separate from the accessory and separate or integral to the control device such that activation of the generator, or the light source, or the speaker, or any combination thereof augments the simulation displayed on the display device.

2. The assembly of claim 1, wherein the instructions are executable by the processor to:

actuate the generator or the speaker or both the generator and the speaker responsive to a demanded image indicated by the signals from the simulation.

3. The assembly of claim 1, wherein the instructions are executable by the processor to:

actuate the generator or the light source or both the generator and the light source responsive to the demanded audio indicated by the signals from the simulation.

4. The assembly of claim 1, wherein the computer control device comprises at least one wireless telephone.

5. The assembly of claim 1, wherein the computer control device comprises at least one computer game controller.

6. An assembly, comprising:
   at least one computer control device;
   at least one accessory detachably engageable with the computer control device and comprising:
   at least one haptic generator;
   at least one light source;
   at least one speaker; and
   at least one processor programmed with instructions to:
   actuate the generator, or the light source, or the speaker, or any combination thereof in response to signals from a simulation being controlled by the computer control device;
   actuate the generator or the speaker or both the generator and the speaker responsive to a demanded image indicated by the signals from the simulation;
   the assembly comprising at least one display device presenting the simulation, and the demanded image is not presented by the display device.

7. An assembly, comprising:
   at least one computer control device;
   at least one accessory detachably engageable with the computer control device and comprising:
   at least one haptic generator;
   at least one light source;
   at least one speaker; and
   at least one processor programmed with instructions to:
   actuate the generator, or the light source, or the speaker, or any combination thereof in response to signals from a simulation being controlled by the computer control device;
   actuate the generator or the light source or both the generator and the light source responsive to a demanded audio indicated by the signals from the simulation;
   the assembly comprising at least one display device having at least one speaker and presenting the simulation, and the demanded audio is not presented by the display device.

8. An assembly, comprising:
   at least one computer control device;
   at least one accessory detachably engageable with the computer control device and comprising:
   at least one haptic generator;
   at least one light source;
   at least one speaker; and
   at least one processor programmed with instructions to:
   actuate the generator, or the light source, or the speaker, or any combination thereof in response to signals from a simulation being controlled by the computer control device; and
   actuate the speaker or the light source or both the speaker and the light source responsive to a demanded haptic indicated by the signals from the simulation.

9. The assembly of claim 8, comprising at least one display device having at least one display device haptic generator and presenting the simulation, and the demanded haptic is not presented by the display device.

10. An assembly, comprising:
    at least one computer control device;
    at least one accessory detachably engageable with the computer control device and comprising:
    at least one haptic generator;
    at least one light source;
    at least one speaker; and
    at least one processor programmed with instructions to:
    actuate the generator, or the light source, or the speaker, or any combination thereof in response to signals from a simulation being controlled by the computer control device; and
    responsive to the accessory being disengaged from the control device, actuate at least one of the light sources, speaker, or generator or any combination thereof to indicate a characteristic of simulation control command input.

11. The assembly of claim 10, wherein the accessory comprises at least one element manipulable to generate the simulation control command input.

12. A device comprising:
    at least one computer storage that is not a transitory signal and that comprises instructions executable by at least one processor to execute at least one of (a) or (b) or (c) or (d) or (e) or any combination thereof:
    (a) activate, on an accessory detachably engaged with a control device for a computer simulation, at least one haptics generator, or at least one light source, or at least one speaker, or any combination thereof in response to signals from the simulation, the signals from the simulation comprising demanded audio and/or demanded images presented on a display device such that activation of the generator, or the light source, or the speaker, or any combination thereof augments the simulation displayed on the display device;
    (b) actuate the generator or the speaker or both the generator and the speaker responsive to a demanded image indicated by the signals from the simulation;
    (c) actuate the generator or the light source or both the generator and the light source responsive to a demanded audio indicated by the signals from the simulation;
    (d) actuate the speaker or the light source or both the speaker and the light source responsive to a demanded haptic indicated by the signals from the simulation;
    (e) responsive to the accessory being disengaged from the control device, actuate at least one of the light sources, speaker, or generator or any combination thereof to indicate quality of simulation control command input.

13. The device of claim 12, wherein the instructions executable by the at least one processor to:
    activate, on an accessory detachably engaged with a control device for a computer simulation, at least one haptics generator, or at least one light source, or at least one speaker, or any combination thereof in response to signals from the simulation, the signals from the simulation comprising demanded audio and/or demanded images presented on the display device such that activation of the generator, or the light source, or the speaker, or any combination thereof augments the simulation displayed on the display device.

14. The device of claim 12, wherein the instructions executable by the at least one processor to:
    actuate the generator or the speaker or both the generator and the speaker responsive to the demanded image indicated by the signals from the simulation.

15. The device of claim 12, wherein the instructions executable by the at least one processor to:
   actuate the generator or the light source or both the generator and the light source responsive to the demanded audio indicated by the signals from the simulation.

16. The device of claim 12, wherein the instructions executable by the at least one processor to:
   actuate the speaker or the light source or both the speaker and the light source responsive to the demanded haptic indicated by the signals from the simulation.

17. The device of claim 12, wherein the instructions executable by the at least one processor to:
   responsive to the accessory being disengaged from the control device, actuate at least one of the light sources, speaker, or generator or any combination thereof to indicate quality of simulation control command input.

* * * * *